United States Patent [19]
Bergman

[11] Patent Number: 5,261,687
[45] Date of Patent: Nov. 16, 1993

[54] AUTOMATIC HITCH ASSEMBLY
[75] Inventor: Ronald W. Bergman, Arthur, Iowa
[73] Assignee: Bergman Manufacturing, Inc., Arthur, Iowa
[21] Appl. No.: 817,143
[22] Filed: Jan. 6, 1992
[51] Int. Cl.⁵ .............................................. B60D 1/26
[52] U.S. Cl. .................................. 280/478.1; 280/508
[58] Field of Search ..................... 280/508, 478.1, 510

[56] References Cited
U.S. PATENT DOCUMENTS

| | | | |
|---|---|---|---|
| 2,481,461 | 9/1949 | Wolfrum | 280/508 |
| 2,904,348 | 9/1959 | Quastad | 280/508 X |
| 3,325,186 | 6/1967 | Lund | 280/508 X |
| 3,421,780 | 1/1969 | Rimmey | 280/508 |
| 3,565,459 | 2/1971 | Reid | 280/510 X |
| 4,451,066 | 5/1984 | Collins | 280/508 |
| 4,482,166 | 11/1984 | Van Antwerp | 280/508 X |

Primary Examiner—David M. Mitchell
Assistant Examiner—Gary C. Hoge
Attorney, Agent, or Firm—Brian J. Laurenzo; Kent A. Herink; Brett J. Trout

[57] ABSTRACT

An automatic hitch assembly for raising, positioning and coupling a tongue portion of a trailing vehicle to a drawbar portion of a pulling vehicle allowing for automatic coupling of the trailing vehicle with respect to the pulling vehicle while the driver remains in the pulling vehicle. A V-shaped guide member on the drawbar portion of the pulling vehicle is pivotal from an uncoupled substantially horizontal orientation, for receiving an elongated probe member on the tongue portion of the trailing vehicle during raising and positioning of the trailer vehicle, to a coupled substantially vertical orientation in which the V-shaped guide member is free from contact from the elongated probe member.

13 Claims, 4 Drawing Sheets

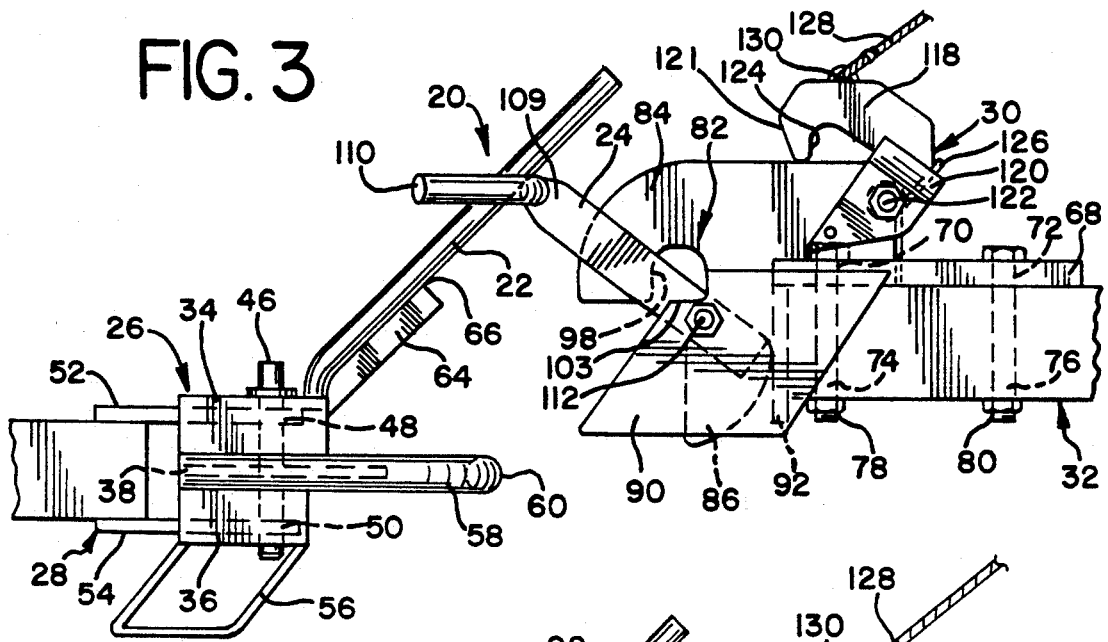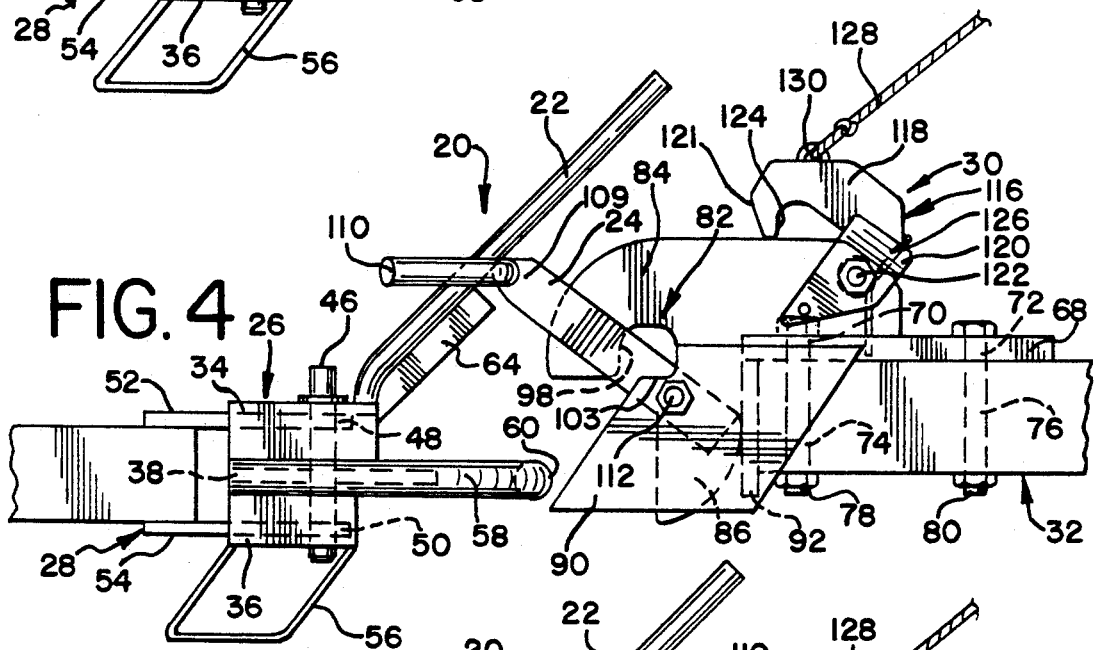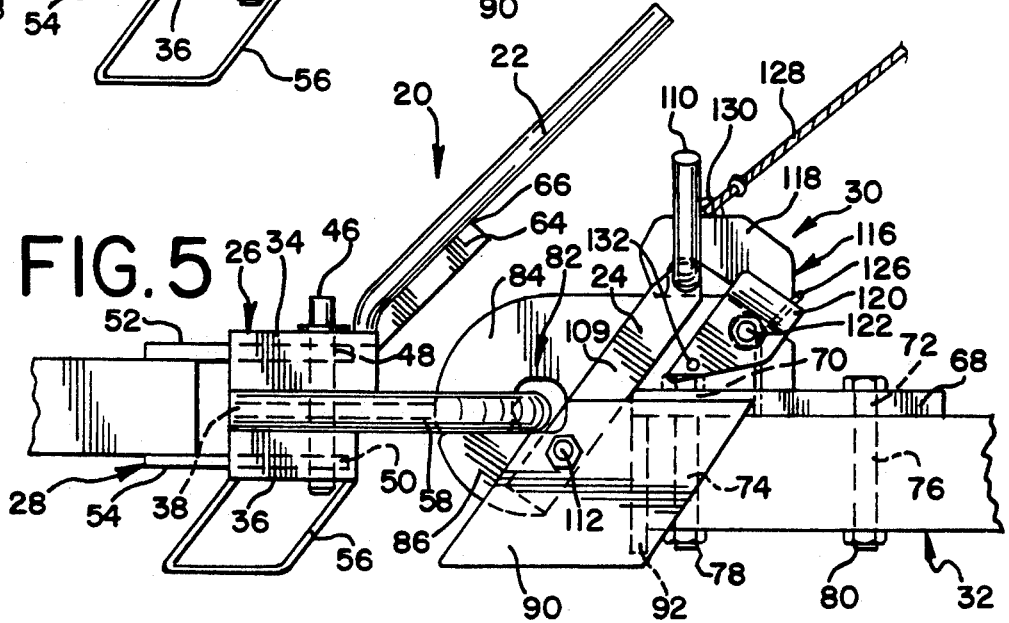

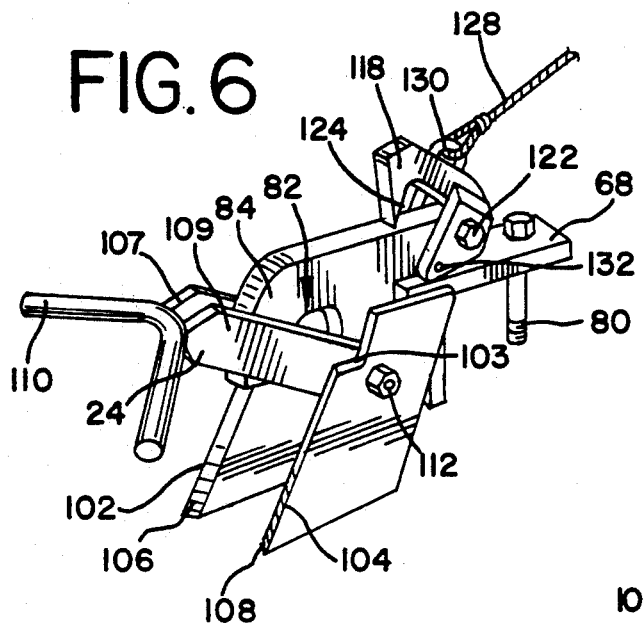
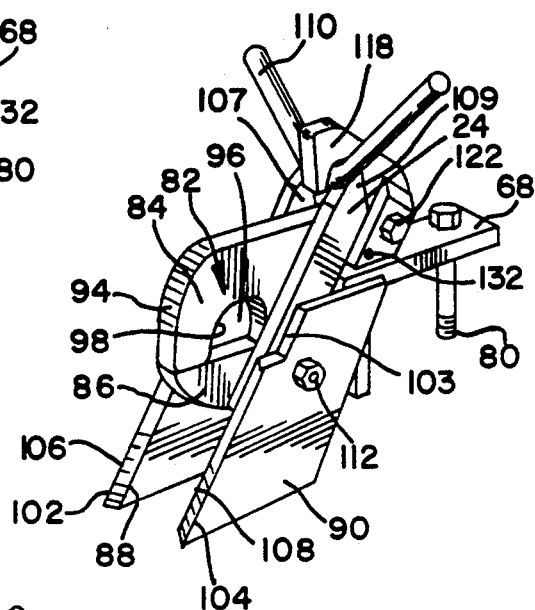
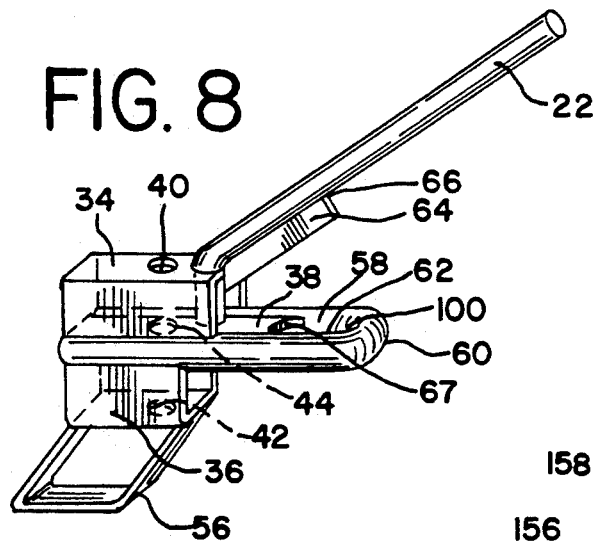
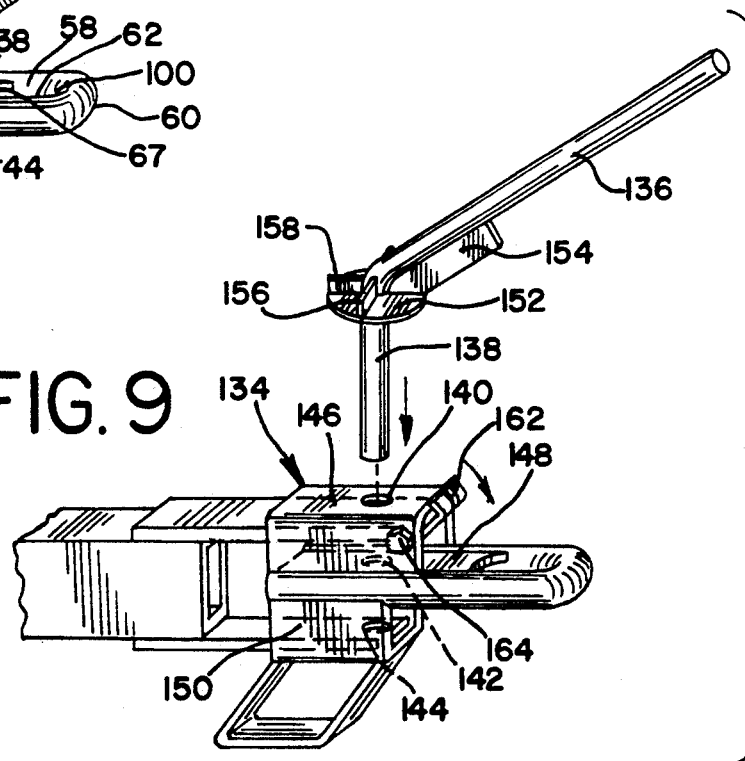

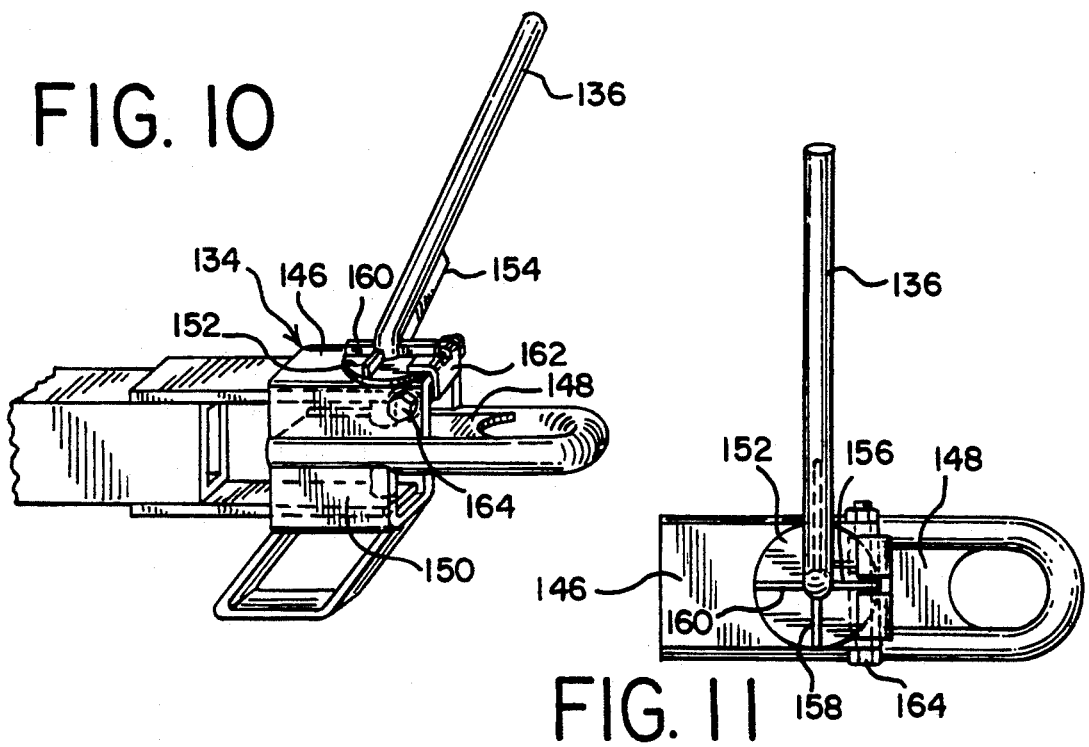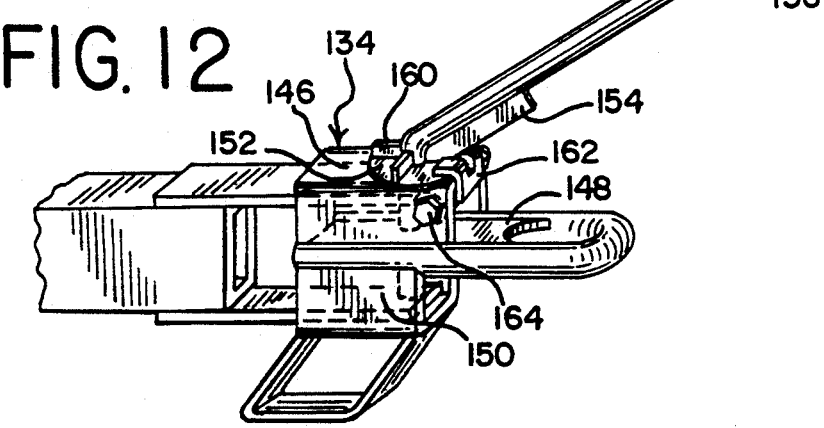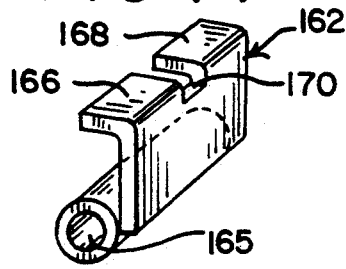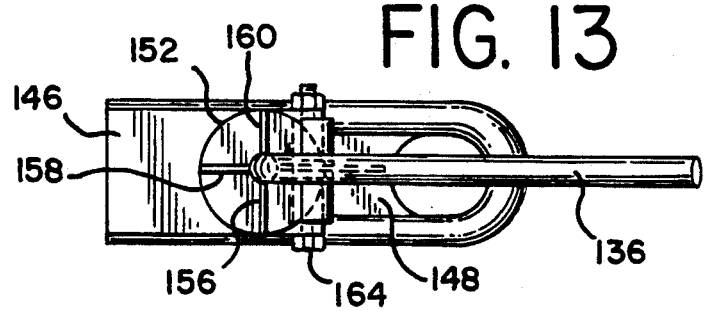

AUTOMATIC HITCH ASSEMBLY

BACKGROUND OF THE INVENTION

This invention relates to hitch assemblies for coupling trailing vehicles to pulling vehicles and, more particularly, to a hitch assembly having a probe member on one vehicle and a guide member on the other vehicle for receipt of the probe member in order to couple the trailing vehicle with respect to the pulling vehicle.

The manual coupling and uncoupling of a trailing vehicle to and from a pulling vehicle is dangerous and inconvenient. The vehicles are usually large, making visual line-up of the relatively small hitch assemblies difficult and often dependent upon trial and error attempts, especially when the driver of the pulling vehicle is alone. The driver must line up the vehicles as close as he can, get out of the pulling vehicle, and go to the hitch assembly in hopes that the respective hitch components are in close enough proximity for coupling. When a second person is available, the second person must be close enough to line up the hitch components. Whether it be the driver or a second person between the two vehicles, this is an inherently dangerous situation. Furthermore, it is neither time nor cost efficient for trial and error coupling with repeated trips by the driver from the pulling vehicle to the hitch assembly and back again. Likewise, it is neither time nor cost efficient for two people to couple and uncouple the vehicles.

Accordingly, it is desirable to provide a hitch assembly which will automatically raise, position, couple and uncouple a tongue portion of a trailing vehicle with respect to a drawbar portion of a pulling vehicle while the driver of the pulling vehicle remains in the pulling vehicle. It is also desirable to provide a hitch assembly which can be visually lined up from the driver's seat of the pulling vehicle. Moreover, conditions of the terrain as well as the relative elevations, space and angle of approach between a pulling vehicle and a trailing vehicle vary greatly so that any automatic hitch assembly must be versatile in these respects. Of course, it is also desirable that the automatic hitch assembly be capable of attachment to existing equipment without modifications to the existing equipment.

A number of attempts have been made to provide automatic hitch assemblies. These hitch assemblies usually have some type of system to guide the tongue portion of the trailing vehicle to the drawbar portion of the pulling vehicle where the vehicles are automatically coupled.

U.S. Pat. No. 2,904,348 discloses a tongue portion of a trailer having a V-shaped, transverse, upstanding rod member which is engageable with an extending guide rod on the drawbar portion of a tractor. However, the V-shaped rod shown in this patent is fixed in position relative to the tongue portion of the trailer. Accordingly, once the extending guide rod is engaged with the upstanding V-shaped rod and the tractor and trailer are coupled, the guide rod and the V-shaped rod remain in contact thus interfering with tight turns and the like. Furthermore, the upright V-shaped rod requires the angle of approach by the tractor to the trailer to be fairly small as the upright V is easy to miss, especially at a sharp angle. Moreover, the device shown in this reference requires the tongue portion of the trailer to be raised from the ground to be lowered by the extending guide rod. Accordingly, this device will not raise a tongue portion of a trailer from the ground. This problem is compounded in certain terrains where the tongue portion of the trailer may be downhill or in a depression so as to actually be below the extending guide rod making it impossible to position the tongue portion of the trailer for automatic coupling with the drawbar portion of the tractor.

Likewise, none of the other prior art devices disclose an automatic hitch assembly wherein a V-shaped guide receives an extending rod in such a manner that the V-shaped guide is in a horizontal orientation rather than a vertical orientation which would increase the possible angle of approach by the pulling vehicle to the trailing vehicle and wherein the V-shaped guide is not in contact with the extending rod after the vehicles are coupled to avoid interference with tight turns and the like.

The difficulties in the prior art hitch assemblies are substantially eliminated by the present invention.

SUMMARY OF THE INVENTION

Accordingly, it is an object of the present invention to provide an automatic hitch assembly wherein a tongue portion of a trailing vehicle is raised, positioned, and coupled with respect to a drawbar portion of a pulling vehicle while the driver of the pulling vehicle remains in the pulling vehicle.

It is another object of the present invention to provide an automatic hitch assembly in which a probe member is received within a guide member to automatically raise and position a tongue portion of a trailing vehicle with respect to drawbar portion of a pulling vehicle for automatic coupling of the two vehicles.

It is still another object of the present invention to provide an automatic hitch assembly in which a V-shaped guide member pivots from an uncoupled substantially horizontal orientation to a coupled substantially vertical orientation.

It is a further object of the present invention to provide an automatic hitch assembly for coupling a pulling vehicle to a trailing vehicle in which the possible angle of approach for the pulling vehicle to the trailing vehicle is increased.

An additional object of the present invention is to provide an automatic hitch assembly in which a probe member is free from the guide member once the vehicles are coupled to avoid interference during sharp turns and the like.

A further object of the present invention is to provide an automatic hitch assembly which can be used with most existing equipment without modifications to the existing equipment.

Yet another object of the present invention is to provide an automatic hitch assembly in which a probe member for positioning a tongue portion of a trailing vehicle for coupling with a drawbar portion of a pulling vehicle may be rotated to the side after coupling for use with power take-off driven equipment.

By the present invention, it is proposed to overcome the difficulties encountered heretofore. To this end, an improved hitch assembly for coupling a pulling vehicle to a trailing vehicle is provided allowing for the automatic positioning and coupling of the trailing vehicle with respect to the pulling vehicle while an operator of the pulling vehicle remains in the pulling vehicle. The improved hitch assembly comprises a coupling loop which is located on the tongue portion of the trailing vehicle, a jaw assembly which is located on the drawbar portion of the pulling vehicle for receiving and closing upon the coupling loop of the trailing vehicle for coupling the pulling and trailing vehicles together, an elongated probe member located on the trailing vehicle and extended outwardly over the coupling loop, and a guide member having a substantially V-shaped portion located on the pulling vehicle, the guide member which is pivotal during the coupling of the pulling and trailing vehicles from an uncoupled position, in which the V-shaped portion of the guide member is in a substantially horizontal orientation for receipt of the elongated probe member therein, in order to raise, position, and couple the coupling loop to the jaw assembly, to a coupled position in which the V-shaped portion is in a substantially vertical orientation.

BRIEF DESCRIPTION OF THE DRAWINGS

FIG. 3 is a front elevational view of the automatic hitch assembly shown in FIG. 1 in an uncoupled position;

FIG. 4 is a front elevational view of the automatic hitch assembly shown in FIG. 3 in an intermediate position during coupling;

FIG. 5 is a front elevational view of the automatic hitch assembly shown in FIG. 2 in a coupled position;

FIG. 6 is a perspective view of the drawbar portion of the automatic hitch assembly shown in FIG. 1 in an uncoupled position;

FIG. 7 is a perspective view of the drawbar portion of the automatic hitch assembly shown in FIG. 6 in a coupled position;

FIG. 8 is a perspective view of the tongue portion of the automatic hitch assembly shown in FIG. 1;

FIG. 9 is a partially exploded perspective view of an alternative embodiment of the tongue portion of the automatic hitch assembly in which the probe member may be rotated;

FIG. 10 is a perspective view of the alternative embodiment shown in FIG. 9 with the probe member rotated 90°;

FIG. 11 is a top plan view of the alternative tongue portion of the automatic hitch assembly shown in FIG. 10;

FIG. 12 is a perspective view of the alternative tongue portion shown in FIG. 11 with the rotatable probe member in a coupling position;

FIG. 13 is a top plan view of the alternative tongue portion of the automatic hitch assembly shown in FIG. 12; and FIG. 14 is a perspective view of the locking bracket of the alternative embodiment.

DETAILED DESCRIPTION OF THE INVENTION

In the Figures, an improved hitch assembly is shown generally at 20 for coupling a pulling vehicle, such as a tractor or pick-up truck, to a trailing vehicle, such as a trailer or farm implement, the hitch assembly 20 having a probe member 22 and a guide member 24 for receipt of the probe member 22 in order to raise, position and couple the trailing vehicle with respect to the pulling vehicle. The hitch assembly 20 may be used at a variety of angle and elevational differences between the pulling vehicle and the trailing vehicle and the driver of the pulling vehicle may remain seated in the pulling vehicle throughout the coupling operation.

Figure 1:
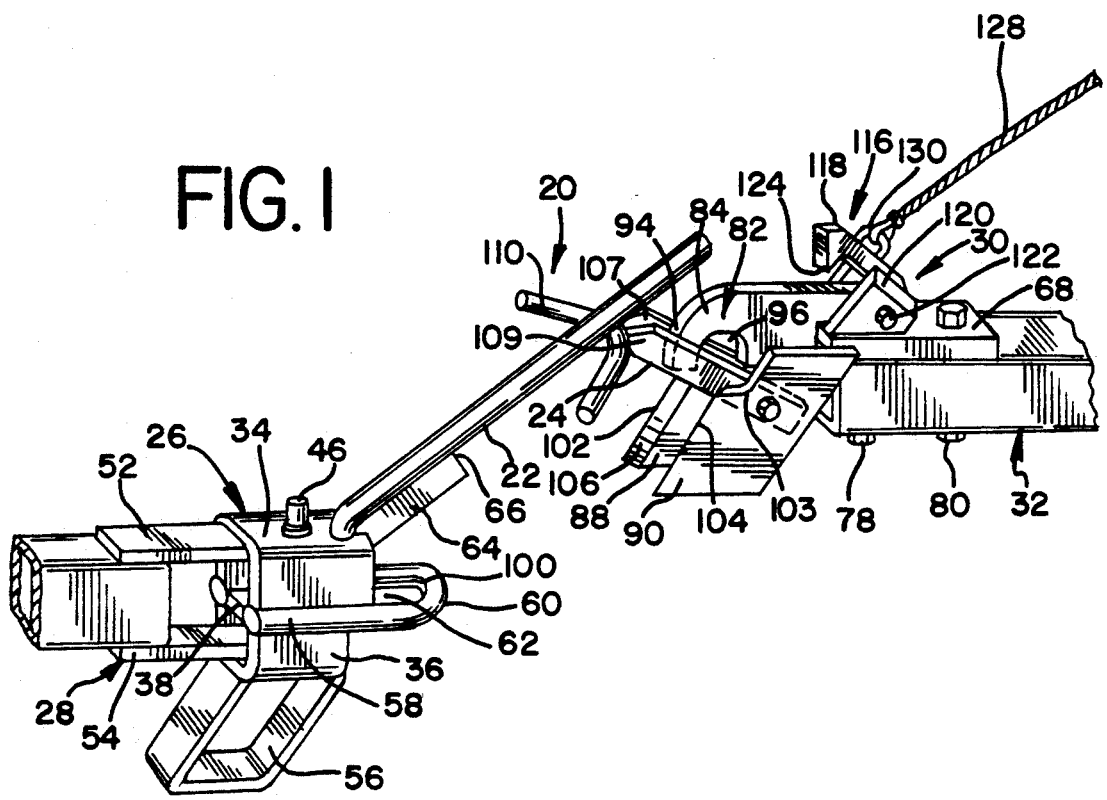
FIG. 1 is a perspective view of an automatic hitch assembly in an uncoupled position in accordance with the present invention.

In FIGS. 1 and 3, the preferred embodiment of the hitch assembly 20 is shown prior to coupling. A tongue adaptor assembly 26 is attached to a tongue portion 28 of the trailing vehicle and a drawbar adaptor assembly 30 is attached to a drawbar portion 32 of the pulling vehicle. The tongue adaptor assembly 26 and the drawbar adaptor assembly 30 can be built in many different ways for retrofit attachment to most tongue and drawbar configurations. Furthermore, the tongue adaptor assembly 26 and the drawbar adaptor assembly 30 are not necessary if the probe member 22 and the guide member 24 are built into an original tongue portion of a trailing vehicle and an original drawbar portion of a pulling vehicle, respectively.

The tongue adaptor assembly 26 comprises a top channel 34 and a bottom channel 36 separated by a pulling plate 38. The top channel 34, bottom channel 36 and pulling plate 38 include aligned apertures 40, 42 and 44, respectively (FIG. 8), for receipt of a pulling pin 46. These apertures correspond in alignment with apertures 48 and 50 on tongue plates 52 and 54, respectively, which allows for attachment of the tongue adaptor assembly 26 to the tongue portion 28 of the trailing vehicle. The tongue adaptor assembly 26 further comprises a foot member 56 to maintain the tongue adaptor assembly 26 at a minimum height above the ground allowing for coupling even after minor sinking of the tongue adaptor assembly 26 during soft ground conditions. The foot member 56 may be of various configurations so long as it provides for minimal clearance above the ground when the vehicles are coupled. The foot member 56 may also be adjustable to accommodate various drawbar heights. A male coupling member such as a coupling loop 58 extends about and laterally forward from the pulling plate 38 and has an arcuate forward end 60 and a central opening 62 for interaction with a female coupling member on the drawbar adaptor assembly 28 during coupling, as will be further described in detail.

In the preferred embodiment, the probe member 22 is an elongated cylindrical rod which extends upwardly and outwardly from the tongue adaptor assembly 26 at an approximate angle of 30° to 60° from horizontal While the probe member 22 shown in the preferred embodiment is a substantially straight cylindrical rod, it is anticipated that a curved cylindrical rod could also be used and may even be advantageous in certain applications. A contact flange 64 is located on the bottom of the probe member and extends from the top channel 34 of the tongue adaptor assembly 26 outwardly to a point 66 on the probe member 22 which is over the center of the central opening 62 of the coupling loop 58 (FIG. 8). The relative positions of the end of the contact flange 64 at 66 and the center of the central opening 62 allow for coupling at various angles of approach. The probe member 22 may be fixed to the tongue adaptor assembly 26 in its forward direction as shown in FIG. 8 or, alternatively, be rotatable about a vertical axis as shown in FIGS. 9–13 which will be further described in detail. The probe member 22 is the first portion of the tongue adaptor assembly 26 to come into contact with the drawbar adaptor assembly 30 during the coupling operation.

The drawbar adaptor assembly 30 comprises a mounting plate 68 having apertures 70 and 72 for corresponding alignment with apertures 74 and 76, respectively, on the drawbar portion 32 of the pulling vehicle. The drawbar adaptor assembly 30 is attached to the drawbar portion 32 of the pulling vehicle with mounting bolt assemblies 78 and 80 which pass through the corresponding aligned apertures described above. The position and size of these apertures and mounting bolt assemblies can be varied for alternative drawbar portions of other pulling vehicles.

A female coupling member is included on the drawbar adaptor assembly 30 such as a jaw assembly, shown generally at 82, comprising a pulling hook 84, a jaw member 86, parallel slide plates 88 and 90, a jaw stop plate 92, and the guide member 24 is located on the mounting plate 68. The pulling hook 84 includes an arcuate exterior surface 94 and an arcuate notch 96 including a pulling surface 98 for contact with a corresponding pulling surface 100 on the forward end 60 of the coupling ring 58 on the tongue adaptor assembly 26 when coupled. The pulling hook 84 may have a rectangular or circular cross-section and may be comprised of one-piece construction or multiple components which are fastened together. It has been found that a circular cross-section may more easily accommodate the coupling loop 58 during turning. Likewise, the pulling plate 38 of the tongue adaptor assembly 26 has an arcuate forward surface 67 for guiding and centering the pulling hook 84 during coupling as well as during turning when the trailing vehicle is coupled to the pulling vehicle.

Figure 2:
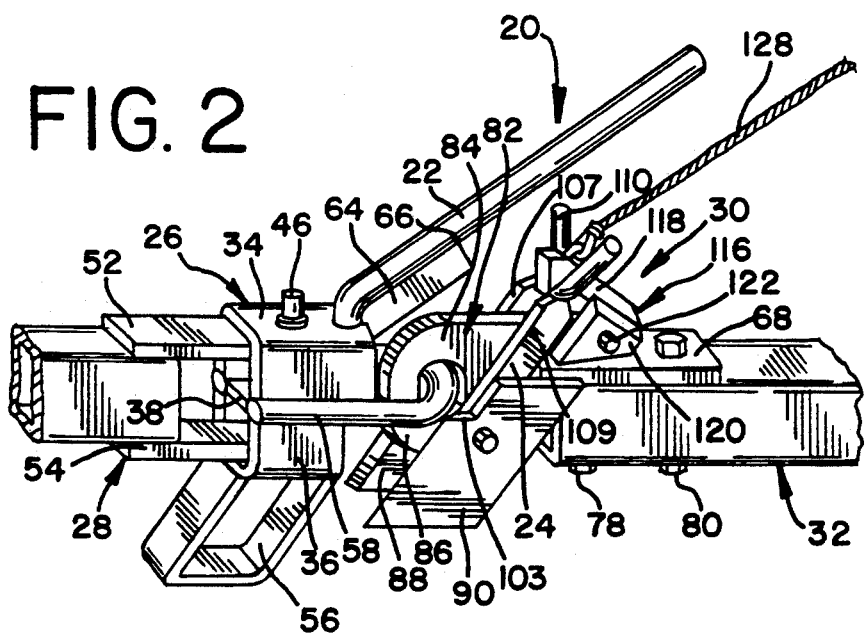
FIG. 2 is a perspective view of the automatic hitch assembly shown in FIG. 1 in a coupled position.

The slide plates 88 and 90 include sloped rear side walls 102 and 104 having chamfered edges 106 and 108 (FIGS. 6 and 7). The slide plates 88 and 90 further include notches to allow for rotation of the coupling ring 58 when coupled during tight turns. Notch 103 is shown in slide plate 90. Slide plate 88 is a mirror image of slide plate 90 and includes a corresponding notch (not shown). Located between the slide plates 88 and 90 are parallel arms 107 and 109 of the guide member 24 which are joined at their tops by a channel or V-shaped rod 110. Located between the parallel arms 107 and 109 of the guide member is the jaw member 86. The slide plates 88 and 90, guide arms 107 and 109, and jaw member 86 all have corresponding aligned apertures (not shown) for receipt of a jaw pivot bolt 112. The guide member 24 and the jaw member 86 are thus allowed to pivot from an uncoupled position as shown in FIGS. 1, 3 and 6 to a coupled position as shown in FIGS. 2, 5 and 7. The uncoupled position of the guide member 24 and the jaw member 86 is limited by the jaw stop plate 92 also located between the slide plates 88 and 90.

A latch assembly 116 comprising a latch member 118 and a kicker plate 120 are pivotally attached at the opposite portion of the pulling hook 84 from the jaw assembly 82. The latch member has a bevelled rear surface 121. The latch member 118, kicker plate 120 and pulling hook 84 include corresponding aligned apertures for receipt of a latch pivot bolt 122. The latch assembly is thus allowed to pivot from an unlatched position as shown in FIGS. 1 and 6 to a latched position as shown in FIGS. 2 and 7, in which a hook portion 124 of the latch member 118 fits about the V-shaped rod 110 of the guide member 24 thus latching the jaw assembly 82 in its coupled position. A coil spring 126 biases the kicker plate 120 to swing rearwardly upon unlatching, thus striking the guide member 24, causing the guide member 24 to swing rearwardly and, causing the jaw assembly 82 to open for uncoupling of the trailing vehicle from the pulling vehicle. A trip rope 128 extends from an eye hook 130 on the latch member 118 to the driver in the pulling vehicle for unlatching the latch assembly 116 upon a tug of the trip rope 128. Furthermore, corresponding aligned apertures (not shown) are located in the kicker plate 120 and the pulling hook 84 for receipt of a locking pin 132 to lock the latch assembly 116 and the jaw assembly 82 in their coupled positions.

The trailing vehicle is coupled to the pulling vehicle in the following manner. The drawbar adaptor assembly 30 is placed into its open position as shown in FIG. 3 in which the guide member 24 is extending rearwardly with the V-shaped rod 110 in a substantially horizontal orientation and the jaw member 86 is open. The pulling vehicle is backed up so that the probe member 22 of the tongue adaptor assembly 26 lines up within the V-shaped rod 110. The horizontal orientation of the V-shaped rod with respect to the angled orientation of the probe member 22 allows for effective coupling at a wide variety of angular and elevational differences.

Once the probe member 22 is within the V-shaped rod 110, the pulling vehicle is backed up further. As the pulling vehicle is backed up, the probe member 22 is guided to the center of the V-shaped rod 110 and, as the probe member 22 passes further into the V-shaped rod 110, the tongue adaptor assembly 26 and the tongue portion 28 of the trailing vehicle is raised so that the coupling loop 58 is moved closer to the slide plates 88 and 90 (See FIG. 4).

When the contact flange 64 on the probe member 22 contacts the V-shaped rod 110, the contact flange 64 causes the guide member 24 to pivot upwardly and forwardly in an arcuate line of travel towards the latch assembly 116. At the same time, the tongue adaptor assembly 26 and the tongue portion 28 of the trailing vehicle is raised further bringing the arcuate forward end 60 of the coupling loop 58 into contact with the chamfered edges 106 and 108 of the sloped rear side walls 102 and 104 of the slide plates 88 and 90, respectively. Since the end 66 of the contact flange 64 is above the central opening 62 of the coupling loop 58, the coupling loop 58 is always centered between the slide plates 88 and 90, at the time the contact flange 64 strikes the V-shaped rod 110 of the guide member 24. Accordingly, the trailing vehicle may be coupled to the pulling vehicle at a wide range of angles therebetween.

As the pulling vehicle is backed up further, the arcuate forward end 60 of the coupling loop 58 is guided up the slide plates 88 and 90 and against the parallel arms 107 and 109 of the guide member 24 causing the guide member 24 to further pivot upwardly and forwardly towards the latch assembly 116. The slope of the rear side walls 102 and 104 of the slide plates 88 and 90 is steeper than that of the probe member 22 causing the probe member 22 to rise out of contact with the V-shaped rod 110. As the guide member 24 pivots toward the latch assembly 116, the attached jaw member 86 simultaneously comes into contact with the pulling hook 84 enclosing the coupling loop 58 within the arcuate notch 96 of the pulling hook 84.

As the V-shaped rod 110 of the guide member 24 continues its upward and forward movement, the V-shaped rod 110 strikes the bevelled rear surface 121 of the latch member 118 causing the hook portion 124 of the latch member 118 to raise and lower about the V-shaped rod 110 which is now resting in a substantially vertical orientation completely free of any interference with the probe member 22.

The trailing vehicle and pulling vehicle are now coupled. The forward end 60 of the coupling loop 58 is enclosed within the arcuate notch 96 of the pulling hook 84 and the pulling surface 100 on the forward end 60 of the coupling ring 58 is in contact with the corresponding pulling surface 98 on the pulling hook 84 (See FIG. 5). The hitch assembly 20 may be locked in this position by inserting locking pin 132. This may be particularly desirable where the trailing vehicle is to be coupled to the pulling vehicle for over-the-road use.

Once the locking pin 132 has been removed, the hitch assembly 20 may be uncoupled by the driver while the driver remains in the pulling vehicle. The driver merely pulls the trip rope 128 causing the hook portion 124 of the latch member 118 to raise. As the latch member 118 raises to open the latch assembly 116, the spring-biased kicker plate 120 and the bevelled surface 121 of the latch member 118 kicks the guide member 24 starting the guide member 24 moving in a rearward and downward arcuate line of travel and, in turn, dropping the jaw member 86 and opening the jaw assembly 82. The forward end 60 of the coupling loop 58 slides down the chamfered edges 106 and 108 of the sloped rear side walls 102 and 104 of slide plates 88 and 90, respectively, and the tongue adaptor assembly 26 and tongue portion 28 of the trailing vehicle drop to the ground and away from the drawbar adaptor assembly 30 and drawbar portion 32 of the pulling vehicle. At the same time, as the V-shaped rod 110 has pivoted downwardly and rearwardly to its horizontal orientation, the probe member 22 is again located within the V-shaped rod 110. As the pulling vehicle is pulled forward, the probe member 22 is removed from the V-shaped rod 110. The drawbar adaptor assembly 30 is now in its uncoupled position for the coupling of a second trailing vehicle.

Should the guide member 24 become latched prior to coupling, the V-shaped rod 110 being in its vertical orientation, the driver merely pulls on the trip rope 128, thus raising the latch member 118 and causing the kicker plate 120 to kick the guide member 24 back into its uncoupled position with the V-shaped rod in its horizontal orientation.

An alternative tongue adaptor assembly 134 is shown in FIGS. 9-13 in which a probe member 136 may be rotated about a vertical axis. The rotatable probe member 136 may be particularly desirable where a trailing vehicle is being coupled to a pulling vehicle having a power take-off mechanism with which the probe member 136 may interfere during use. Accordingly, once the trailing vehicle has been coupled to the pulling vehicle, the probe member 136 may be rotated out of the way either 90° to the side or 180° to the rear.

A second feature of the alternative embodiment disclosed in FIGS. 9-13 is that the rotating probe member 136 may also be combined with a pulling pin 138 and used to connect the tongue adaptor assembly 134 to the tongue portion 28 of the trailing vehicle. The pulling pin portion 138 of the probe member 136 may be passed through aligned apertures 140, 142 and 144 in the channel 146, pulling plate 148, and bottom channel 150, respectively, of the tongue adaptor assembly 134 and aligned apertures 48 and 50 (See FIGS. 3-5) of the tongue portion 28 of the trailing vehicle.

A circular stop plate 152 is located above the pulling pin portion 138 of the probe member 136 and rests on top of top channel 146 of the tongue adaptor assembly 134. A contact flange 154 extends from the circular stop plate 152 along a portion of the probe member 136. The stop plate 152 also includes raised splines 156, 158 and 160 at 90° increments away from the contact flange 154. A locking bracket 162 locks the probe member 136 in its desired orientation. The locking bracket 162 is shown in detail in FIG. 14 and is pivotal about a locking bracket pivot bolt 164 which passes through aligned apertures (not shown) in the top channel 146 and a corresponding aligned aperture 165 in the locking bracket 162. The locking bracket 162 is spring biased into its closed position (spring not shown). The locking bracket 162 includes two tabs 166 and 168 on either side of a slot 170 for receipt of the contact flange 154 or raised spline 156, 158 or 160.

To rotate the probe member 136, the locking bracket 162 is opened by pivoting the locking bracket 162 forward allowing the probe member 136 to rotate until the desired contact flange 154 or raised spline 156, 158 or 160 will be located in the slot 170 of the bracket 162 when the bracket 162 is closed. The tabs 166 and 168 keep the probe member 136 from further undesired rotation.

FIGS. 10 and 11 show the tongue adaptor assembly 134 with the probe member 136 rotated 90° so as not to interfere with a power take-off mechanism while in use. FIGS. 12 and 13 show the tongue adaptor assembly 134 with the probe member 136 rotated back to its coupling position with the contact flange 154 locked into slot 170 of the locking bracket 162.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, while the guide member 24 of the preferred embodiment includes a V-shaped rod, it is contemplated that other shapes such as a "U", "C" or other channel could instead be used. In addition, certain variations could be made to the components of the drawbar adaptor assembly 30 and the tongue adaptor assembly 26 which do not depart from the scope of the invention. Furthermore, while the rotatable probe of the alternative embodiment is shown as being attached by the locking bracket 162, it is anticipated that many other fastening systems could be used, including spring-loaded pins, etc...

What is claimed is:

1. An improved hitch assembly for coupling a first vehicle to a second vehicle, said improved hitch assembly allowing for automatic positioning and coupling of said first and second vehicles while an operator of said vehicles remains in one of said vehicles, the improved hitch assembly comprising:
    (a) a male coupling member located on said first vehicle;
    (b) a female coupling member located on said second vehicle, opposite said first vehicle, for receiving and closing upon said male coupling member of said first vehicle in order to couple said first and second vehicles together;
    (c) an elongated probe member located on said first vehicle, said elongated probe member extended outwardly over said male coupling member;
    (d) a guide member located on said second vehicle, said guide member having a substantially channel-shaped portion, said guide member being pivotal during said coupling of said first and second vehicles from an uncoupled position, in which said channel-shaped portion of said guide member is in a substantially horizontal orientation for receipt of said elongated probe member therein i order to raise, position, and couple said male coupling member to said female coupling member, to a coupled position in which said channel-shaped portion is in a substantially vertical orientation; and (e) pivot means for pivoting said guide member relative to said second vehicle between said uncoupled position and said coupled position.

2. The invention, according to claim 1, in which said pivot means comprises a contact flange on said elongated probe member for striking said channel-shaped portion of said guide member and causing said guide member to pivot from said uncoupled position to said coupled position.

3. The invention, according to claim 1, in which said elongated probe member is extended outwardly at an acute angle from said male coupling member.

4. The invention, according to claim 1, in which said elongated probe member may be rotated about a vertical axis.

5. An improved hitch assembly for coupling a tongue portion of a trailing vehicle to a drawbar portion of a pulling vehicle, said improved hitch assembly allowing for automatic raising, positioning, and coupling of said tongue portion of said trailing vehicle with respect to said drawbar portion of said pulling vehicle, while a driver of said pulling vehicle remains in said pulling vehicle, the improved hitch assembly comprising:

(a) a coupling loop located on said tongue portion of said trailing vehicle;

(b) a jaw assembly located on said drawbar portion of said pulling vehicle, for receiving and closing upon said coupling loop of said trailing vehicle in order to couple said trailing vehicle and said pulling vehicle together;

(c) an elongated probe member located on said trailing vehicle, said prove member extended outwardly over said coupling loop;

(d) a guide member located on said pulling vehicle, said guide member having a substantially V-shaped portion, said guide member being pivotal during said coupling of said trailing vehicle to said pulling vehicle, from an uncoupled position in which said V-shaped portion of said guide member is in a substantially horizontal orientation for receipt of said elongated probe member therein in order to raise, position and couple said coupling loop to said jaw assembly, to a coupled position in which said V-shaped portion is in a substantially vertical orientation; and (e) pivot means for pivoting said guide member relative to said pulling vehicle between said uncoupled position and said coupled position.

6. The invention, according to claim 5, in which said pivot means comprises a contact flange for striking said V-shaped portion of said guide member and causing said guide member to pivot from said uncoupled position to said coupled position.

7. The invention, according to claim 5, in which said elongated probe member is extended outwardly at an acute angle from said coupling loop.

8. The invention, according to claim 5, in which said elongated probe member may be rotated about a vertical axis.

9. An improved hitch assembly for coupling a tongue portion of a trailing vehicle to a drawbar portion of a pulling vehicle, said improved hitch assembly allowing for automatic raising, position, and coupling of said tongue portion of said trailing vehicle with respect to said drawbar portion of said pulling vehicle, while a driver of said pulling vehicle remains in said pulling vehicle, the improved hitch assembly comprising:

(a) a coupling loop located on said tongue portion of said trailing vehicle;

(b) an elongated probe member located on said tongue portion of said trailing vehicle and extended outwardly over said coupling loop;

(c) a pulling hook located on said hitch portion of said pulling vehicle, said pulling hook having an arcuate notch for receipt of said coupling loop during a coupling operation;

(d) a jaw member located below said pulling hook, said jaw member being pivotal from an uncoupled position to a coupled position in which it abuts said pulling hook and closes said arcuate notch after said coupling loop has been received in said arcuate notch;

(e) a pair of parallel slide plates, one of said slide plates located on either side of said jaw member, said slide plates each having a sloped rear side wall for receipt and guidance of said coupling loop into said arcuate notch;

(f) a guide member, said guide member having a pair of parallel arms one of said parallel arms located on either side of said jaw member, said parallel arms further located between said parallel slide plates, said parallel arms connected at the top to a substantially V-shaped rod, said parallel arms connected at the bottom by a pivot member which passes through said parallel arms of said guide member, said jaw member, and said parallel slide plates, said guide member and said jaw member thereby being pivotal between said parallel slide plates from an uncoupled position in which said V-shaped rod of said guide member is in a substantially horizontal orientation for receipt of said elongated probe member therein in order to position said coupling loop at the bottom of said slide plates, to a coupled position in which said V-shaped rod of said guide member is in a substantially vertical orientation, said coupling loop is within said arcuate notch of said pulling hook, and said jaw member has closed said arcuate notch;

(g) pivot means for pivoting said guide member between sand uncoupled position and said coupled position; and (h) a latch member located above said pulling hook for pivotal movement from an uncoupled position to a coupled position in which it receives and holds said V-shaped rod in its substantially vertical orientation thereby latching said hitch assembly in its coupled position.

10. The invention, according to claim 9, in which said pivot means comprises a contact flange on said elongated probe member for striking said V-shaped rod of said guide member and causing said guide member to pivot from said uncoupled position to said coupled position.

11. The invention, according to claim 9, in which said elongated probe member is extended outwardly at an acute angle from said coupling loop.

12. The invention, according to claim 9, in which said elongated probe member is extended outwardly at an acute angle from said coupling loop which is less than the angle of said sloped rear side walls of said parallel slide plates.

13. The invention, according to claim 9, in which said elongated probe member may be rotated about a vertical axis.

* * * * *